United States Patent
Dautert et al.

(10) Patent No.: US 7,926,553 B2
(45) Date of Patent: Apr. 19, 2011

(54) COOLING SYSTEM FOR ELECTRONIC DEVICES, IN PARTICULAR, COMPUTERS

(75) Inventors: Thomas Dautert, Dresden (DE); Eberhard Gunther, Annaberg-buchholz (DE)

(73) Assignee: Asetek A/S (DK)

( * ) Notice: Subject to any disclaimer, the term of this patent is extended or adjusted under 35 U.S.C. 154(b) by 795 days.

(21) Appl. No.: 11/817,916

(22) PCT Filed: Mar. 7, 2006

(86) PCT No.: PCT/DK2006/000133
§ 371 (c)(1),
(2), (4) Date: Sep. 6, 2007

(87) PCT Pub. No.: WO2006/094505
PCT Pub. Date: Sep. 14, 2006

(65) Prior Publication Data
US 2008/0247137 A1    Oct. 9, 2008

(30) Foreign Application Priority Data

Mar. 7, 2005 (DE) .................. 10 2005 012 350
Mar. 7, 2005 (DE) .................. 20 2005 004 349 U

(51) Int. Cl.
*H05K 7/20* (2006.01)
(52) U.S. Cl. ............... 165/104.14; 165/104.33; 361/700
(58) Field of Classification Search ............. 165/104.14, 165/104.33; 361/700
See application file for complete search history.

(56) References Cited

U.S. PATENT DOCUMENTS

| 4,503,906 A | * | 3/1985 | Andres et al. ............ 165/104.14 |
| 5,076,351 A | * | 12/1991 | Munekawa et al. ...... 165/104.14 |
| 5,168,919 A | | 12/1992 | Berenholz et al. |
| 5,198,889 A | * | 3/1993 | Hisano et al. ................. 257/678 |
| 5,216,580 A | | 6/1993 | Davidson et al. |
| 5,253,702 A | | 10/1993 | Davidson et al. |
| 5,283,464 A | * | 2/1994 | Murase .................... 165/104.14 |
| 5,579,830 A | * | 12/1996 | Giammaruti ............. 165/104.33 |
| 5,647,430 A | | 7/1997 | Tajima |
| 5,737,923 A | * | 4/1998 | Gilley et al. ............. 165/104.33 |
| 6,549,408 B2 | | 4/2003 | Berchowitz |
| 6,675,874 B2 | * | 1/2004 | Mast et al. ...................... 165/45 |
| 6,843,307 B2 | | 1/2005 | Yuyama et al. |
| 6,899,165 B1 | * | 5/2005 | Wu .......................... 165/104.26 |
| 6,926,070 B2 | * | 8/2005 | Jenkins et al. ............ 165/104.33 |
| 6,966,363 B2 | * | 11/2005 | Gailus et al. ............. 165/104.33 |
| 7,457,118 B1 | * | 11/2008 | French et al. ................. 361/700 |
| 2002/0181200 A1 | | 12/2002 | Chang |
| 2004/0035558 A1 | | 2/2004 | Todd et al. |

FOREIGN PATENT DOCUMENTS

| DE | 19527674 | | 2/1997 |
| DE | 20 2004004016 | | 5/2004 |
| EP | 0767415 | | 4/1997 |
| EP | 1387139 | | 2/2004 |
| JP | 54047159 A | * | 4/1979 |
| JP | 56119492 A | * | 9/1981 |
| WO | 02093339 | | 11/2002 |

* cited by examiner

*Primary Examiner* — Leonard R Leo
(74) *Attorney, Agent, or Firm* — Polster, Lieder, Woodruff & Lucchesi, L.C.

(57) ABSTRACT

The invention concerns a cooling system for electronic devices, especially computers, comprising an evaporator (1), a vapor-distribution and condensate-collection element (3) and a condenser (2) with a plurality of condenser pipes (6) and a block of fins (5) connecting the condenser pipes (6), wherein the condenser pipes (6) are arranged parallel to each other and extend upwards from the vapor-distribution and condensate-collection element (3) and are closed at their upper ends.

6 Claims, 5 Drawing Sheets

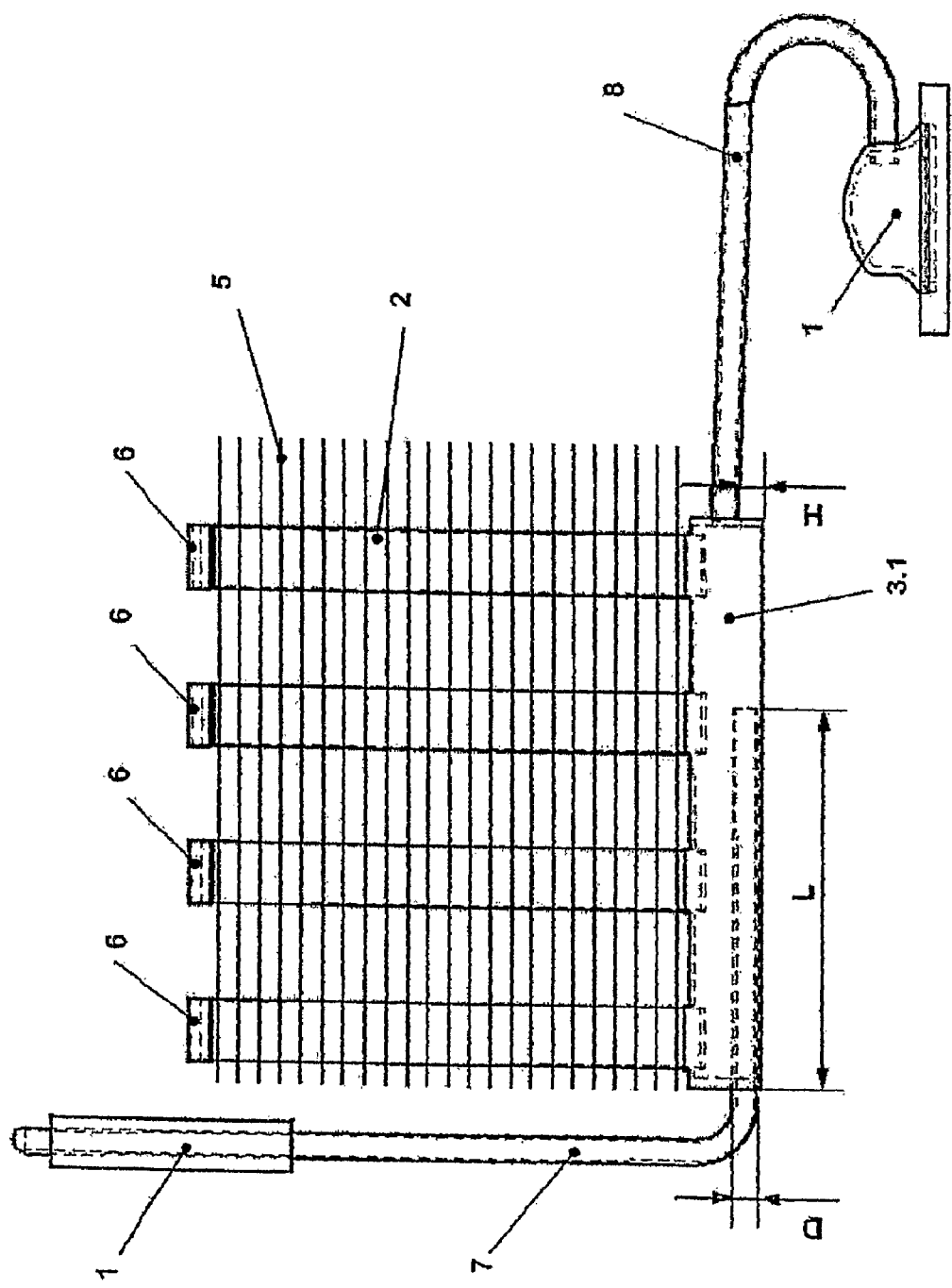

COOLING SYSTEM FOR ELECTRONIC DEVICES, IN PARTICULAR, COMPUTERS

Figure 1:
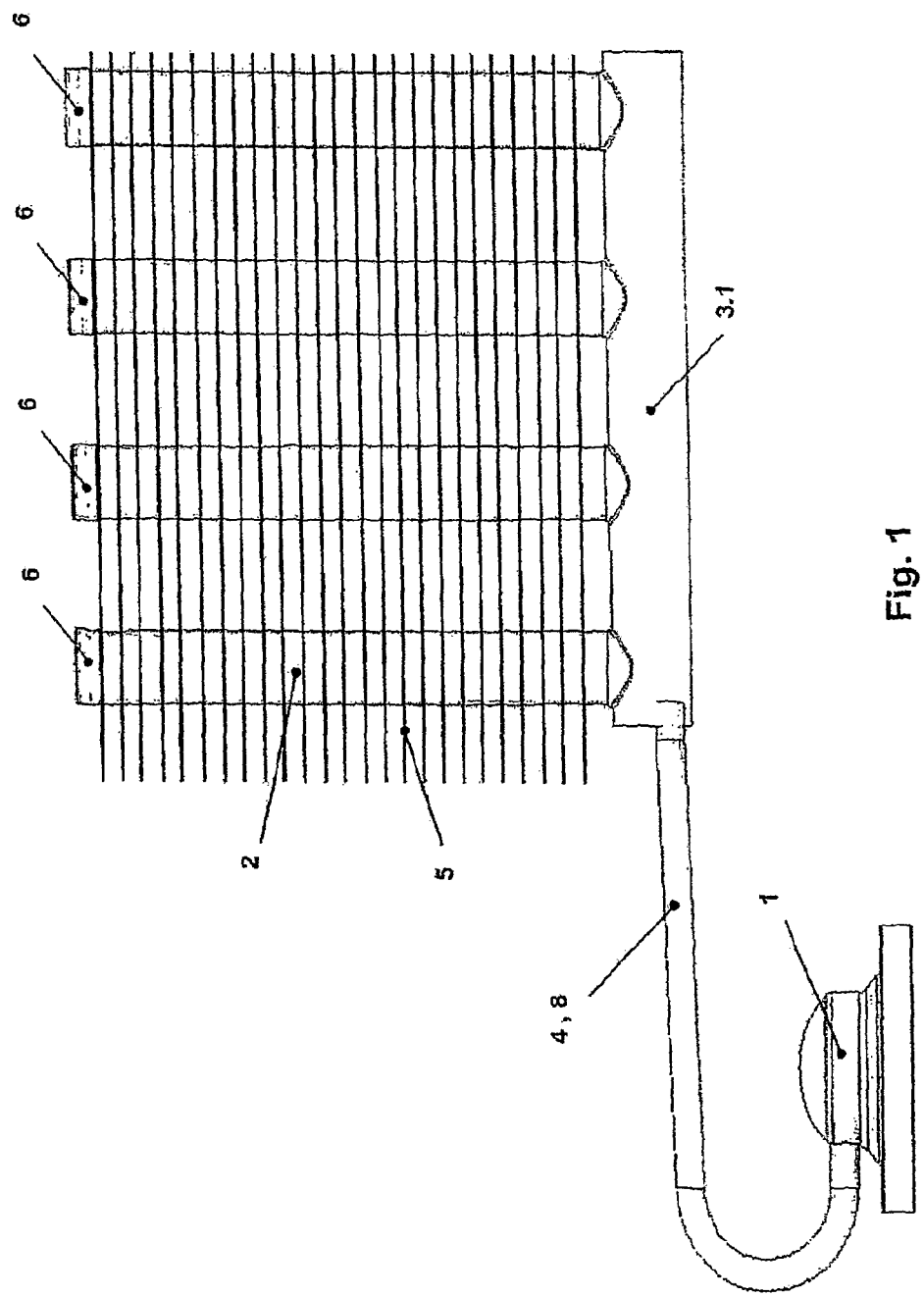

This application is the US National Phase under 35 U.S.C. §371 of International Application No. PCT/DK2006/000133 having an international filing date of Mar. 7, 2006 and which claims priority to German application numbers 10 2005 012 350.3 and 20 2005 004 349.4, both of which were filed on Mar. 7, 2005.

The invention relates to a cooling system for electronic devices, especially computers. There is a need for cooling of electronic devices that emit a heat loss during the processing of information in the electronic components. To ensure smooth functioning of the electronic devices, this heat loss must be dissipated efficiently, since the susceptibility of the individual electronic components to break down increases with rising temperatures, or these components may even fail beyond a certain temperature.

Cooling systems according to the subject matter of the invention are used for electronic devices in the broadest sense to ensure their operating behavior, life and efficient working. Besides their use in computers, such cooling systems can also be used in domestic electronic appliances, electronic measuring devices and also in entertainment electronic devices or similar devices.

On this background, various concepts have been developed in the prior art for the cooling of electronic components, especially of computers.

Firstly, cooling elements essentially made of aluminum and copper are used, which are placed in contact with the heat loss radiating electronic component, and which absorb and dissipate the heat to the environment by thermal conduction across a surface enlarged by fins.

In another attempted solution, the heat loss of electronic components is dissipated from the electronic devices using latent heat coolers with vapor distribution and formation and return of condensate to the evaporator.

U.S. Pat. No. 6,549,408 B2 discloses a cooling system for a CPU, based on the thermo-siphon principle. The evaporator is placed on the CPU and is connected to a heat exchanger using a vapor pipe. From the heat exchanger, the condensate flows into a specifically dimensioned separate condensate pipe back to the evaporator. This system uses an air-cooled or also a water-cooled condenser.

Further, a prior art heat exchanger unit for cooling CPUs of laptop computers is disclosed in EP 0 767 415 A2, wherein an evaporator is placed on the CPU and the coolant vapor is distributed via a vapor pipe to a condenser and from there the condensate is led back to the evaporator through a second condensate return pipe.

WO 02/093339 A1 discloses a heat transfer element with coolant for use in computers. The evaporator is connected to the condenser through a vapor pipeline and the condensate is returned through a separate condensate pipe.

According to prior art, the disadvantage of the stated systems is that two pipes are required, one to convey the vapor from the evaporator connected to the heat source through a vapor line to the condenser and another to transport the condensate from the condenser back to the evaporator through a condensate pipe.

Another concept of device cooling is based on the use of heat pipes, which is characterized by one or more heat pipes, with the evaporator side being placed on the electronic component, and by the radiated heat being dissipated to the environment through evaporation on the electronic component, followed by condensation in the opposite end of the heat pipe, which acts as condenser.

DE 196 10 853 A1 discloses a cooling unit for an electronic component, which is designed as a U-shaped heat pipe. Both ends of the heat pipe act as evaporator and are connected to the heat loss radiating electronic component. Ribs forming the condenser part of the heat pipe are provided between the parallel arms of the heat pipe, up to the region of the bend. A plurality of U-shaped curved heat pipes is connected to each other with fins, which in the upper region form a condenser block. In the lower region, a plurality of evaporator surfaces of the heat pipe is placed on the electronic component.

The disadvantage of the mentioned prior art in transporting the radiated heat loss through heat pipes is that only a small quantity of heat can be transported with classical heat pipes of the specified type.

Further, in DE 195 27 674 A1, a cooling device in the prior art has been disclosed, which manages the transportation of vapor and condensate with only one pipe. The coolant vapor formed in the evaporator rises up and condenses on the outer wall in the upper part of the heat pipe and flows back along the wall to the evaporator. The latent heat cooler in the upper part is provided with fins, which are meant for increasing the surface area and improving the heat transfer to the cooling air.

According to US 2002/0181200 A1, a cooling system for computers is disclosed, which can cool a plurality of sources of heat in one electronic device. A heat loss generator is connected through a heat pipe to a condenser having the form of an air deflector device, through which cooling air flow is directed. The coolant vapor condenses in the air deflector device designed as condenser and the condensate is transported back to the evaporator through the heat pipe. In parallel, heat is transferred from another source of heat to the condenser of the heat pipe through the heat conduction of a metal plate. The air deflector device absorbs this heat transferred through heat conduction and dissipates it to the cooling air flowing through the air deflector.

The disadvantage in the prior art cooling systems with a single pipe for the transport of vapor and condensate is that only a small condenser surface area is available and hence the transferable radiated quantity of loss heat is limited. The condenser surface area available in this manner on the air side is too small because of the air cooling and associated poor heat transmission coefficients.

On the whole, the disadvantage in the solutions in the prior art is that a large number of parts are required for latent heat coolers with vapor distribution and condensate reflux. Further, a very high noise burden is registered in coolers based on heat transfer with small high-speed fans, and which is not acceptable for a number of electronic devices.

Last but not the least, high a number of heat pipes are required in heat pipe coolers according to prior art, due to low efficiency of the classical heat pipes, which poses problems of manufacturing and costs.

A large number of known cooling systems also require spatial proximity to the heat source and heat sink, which restricts the flexibility of the cooling systems and their use.

The object of the present invention is to transport larger quantities of radiated heat with an economic production-viable cooling system, thereby achieving a better cooling effect.

The foremost object of the present invention the cost-efficient production of the cooling systems and the provision of sufficient cooling capacity.

According to the invention, the object is fulfilled with a cooling system for electronic devices, especially computers, comprising an evaporator, a vapor-distribution and condensate-collection element and a condenser with a plurality condenser pipes and a fin block connecting the condenser pipes, wherein the condenser pipes are arranged parallel to each other and extend upwards from the vapor-distribution and condensate-collection element and are closed at their top ends.

It is especially advantageous if the vapor-distribution and condensate-collection element is designed as horizontal pipe. The condenser pipes are fitted radially into the vapor-distribution and condensate-collection element along a surface line of the horizontal pipe.

The fitting is provided by a prefabricated individual pipe or using prefabricated collars and can be combined with pipe sections, which enable modular construction of the vapor-distribution and condensate-collection elements of various sizes.

For applications in which the source of heat loss and the heat sinks are spatially separated from each other, it is advantageous to provide a connecting pipe between the evaporator and the vapor-distribution and condensate-collection element.

In the application of the cooling system according to this invention, wherein the condenser is positioned below the evaporator, the connecting pipe is designed as a pipe with heat pipe structure. The heat pipe structure enables the condensate to be transported against the force of gravity from the condenser into the evaporator above.

For applications of the cooling system according to this invention, wherein the condenser is positioned above the evaporator, the pipe is designed without the heat pipe structure to save costs.

The cooling system is highly suitable to fit multiple evaporators into a vapor-distribution and condensate-collection element, in a particularly beneficial manner.

A design alternative to the presented object of invention is to design the vapor-distribution and condensate-collection element and the evaporator as an integral unit wherein a heat sink is placed directly above the source of heat loss, which results in cost saving.

The preferable design of the vapor-distribution and condensate-collection element in this constellation is level and the condenser pipes are fitted orthogonally to this level surface and are connected to a compact condenser by a block of fins.

According to the concept of the invention in its two basic designs, the condenser surface area is significantly increased as compared to the known heat pipes, by fitting a vapor-distribution and condensate-collection element according to this invention. This enables the optimum utilization of the small evaporator surface area, thus resulting in a favorable ratio of evaporator and condenser efficiency.

Moreover, designs using connecting pipes according to this invention are highly suitable for conducting heat from the heat source to suitable areas in the form of vapor transport, to be effective with greater efficiency in a condenser that can be dimensioned proportionally large enough.

Other details, features and advantages of the invention are stated in the following description of sample designs with reference to the related drawings. The following figures show:

FIG. 1: Cooling system with connecting pipe between evaporator and the vapor-distribution and condensate-collection element, FIG. 2*a*: Cooling system without connecting pipe with evaporator positioned above the source of heat loss, FIG. 2*b*: Cross section of a cooling system without connecting pipe with evaporator fitted above the source of heat loss, FIG. 3: Cooling system with two sources of heat loss, fitted differently in relation to the condenser, FIG. 4: Cooling system with tubular vapor-distribution and condensate-collection element with modular structure, FIG. 5: Cooling system with level vapor-distribution and condensate-collection element, FIG. 6*a*: Perspective view of a cooling system with a level vapor-distribution and condensate-collection element and FIG. 6*b*: Level vapor-distribution and condensate-collection element with tie rod for using working media with high operating pressures.

FIG. 1 shows a cooling system according to the invention, which essentially comprises the evaporator 1, connecting pipe 4 to the vapor-distribution and condensate-collection element 3 and condenser 2 with a fin block 5 and condenser pipes 6. The connecting pipe 4 is designed as a simple pipe without any internal heat pipe structure 8. The design of this invention can be used advantageously in applications where the heat source is located below the heat sink and both are not adjacent to each other. The vapor formed in the evaporator part reaches the tubular vapor-distribution and condensate-collection element 3.1 through the connecting pipe 4, and from there it reaches the condenser 2. The condensate formed in the condenser 2 collects in the tubular vapor-distribution and condensate-collection element 3.1 and is returned to the evaporator 1 through the connecting pipe 4 designed without water bag, where the coolant circulation ends and the evaporation begins again. The connecting pipe 4 is fitted, as shown, axially through the front side of the tubular vapor-distribution and condensate-collection element 3.1, and it is ensured that the condensate returns to the evaporator 1 at the lowest point of the vapor-distribution and condensate-collection element 3.1. A further embodiment of the invention, and which is not shown, consists in the fitting of connecting pipe 4 in the surface line of the tubular vapor-distribution and condensate-collection element 3.1. Depending on the level of the evaporator 1 and the vapor-distribution and condensate-collection element 3.1, the connecting pipe can be fitted radially or tangentially.

Figure 2B:
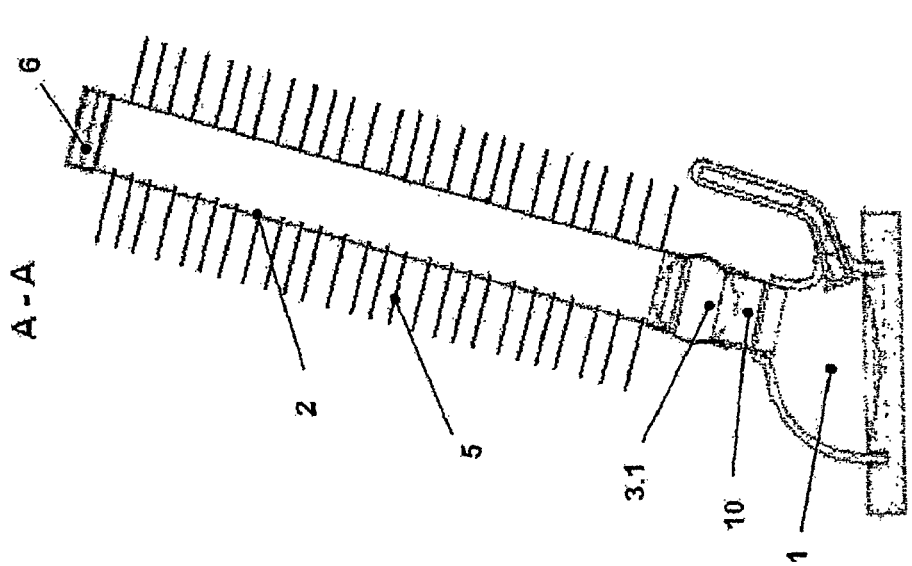
Figure 2A:
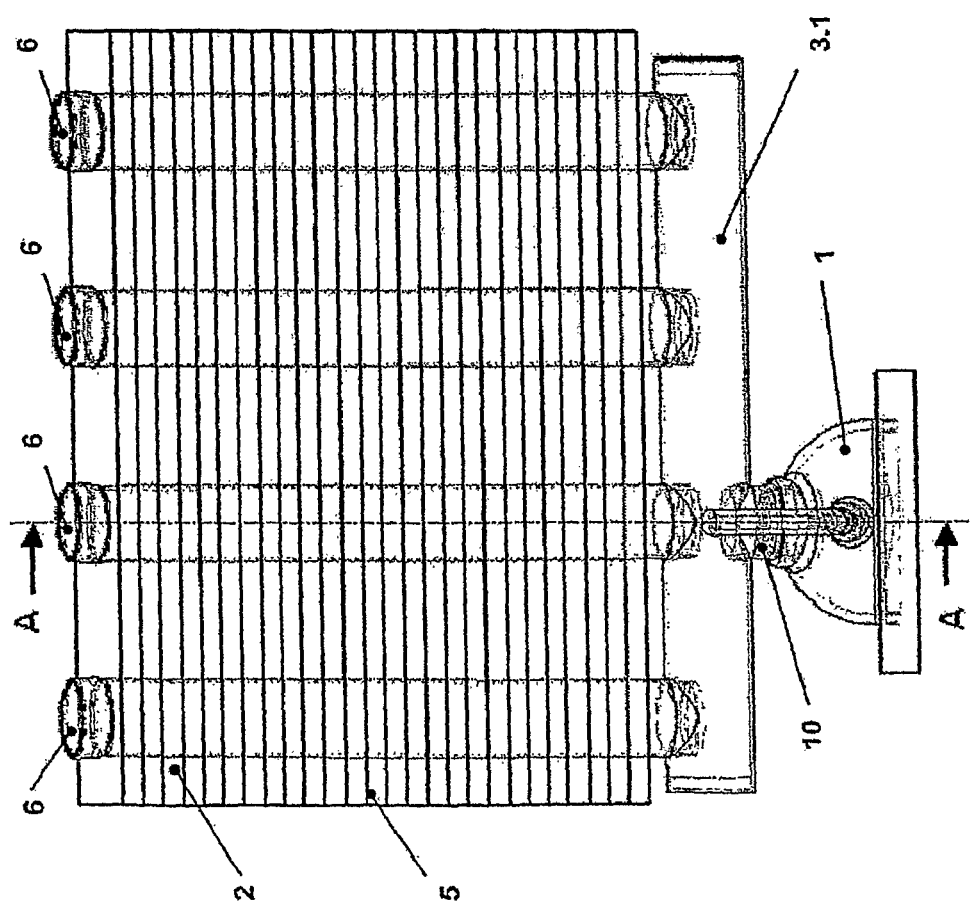

FIG. 2*a* and FIG. 2*b* present the front view and cross section respectively of an embodiment of the invention without a separate connecting pipe 4. Such embodiments are used if the heat source is directly below the heat sink and both can be located adjacent to each other.

The vapor-distribution and condensate-collection element 3 is preferably designed as a pipe. The condenser pipes 6 are fitted on a lower side into the tubular vapor-distribution and condensate-collection element 3.1 and they extend upward radially from the vapor-distribution and condensate-collection element 3.1. The condenser pipes 6 are closed at the other top end. The condenser pipes 6 are fitted preferably on a surface line of the tubular vapor-distribution and condensate-collection element 3.1. The embodiment of the vapor-distribution and condensate-collection element 3 as a pipe and the fitting of condenser pipes 6 into the pipe represent an extremely economical embodiment of this connection assembly with less connection joints and soldering joints, which contributes to an economical production of the overall system. Further, the presented solution has production benefits because of reduced process steps and use of pipes of standard shapes.

Depending on the given conditions in the application of the cooling system, the condenser pipes 6 can be fitted diagonally or orthogonally to the evaporator surface. According to the invention, it is necessary to have a slight inclination of at least 2° to 3° from the horizontal axis, to ensure the transportation of condensate towards the evaporator 1 by gravitational force.

The vapor-distribution and condensate-collection element 3.1 is connected and aligned with the evaporator 1 using an adapter 10, according to the presented preferred embodiment of the invention.

Another embodiment of the invention, not presented here, is the construction and connection of the vapor-distribution and condensate-collection element 3.1 with the evaporator 1 using a condenser pipe 6, drawn through the vapor-distribution and condensate-collection element 3.1, the lower end of said connecting pipe being fitted directly to the evaporator 1. In the area of vapor-distribution and condensate-collection element 3.1, the condenser pipe 6 concerned is designed to be permeable to vapor, so that the vapor can reach the other condenser pipes 6 through the vapor-distribution and condensate-collection element 3.1 and it is possible for the condensate to return in a similar manner. The presented embodiment shows an especially beneficial dimensioning, which consists of four condenser pipes 6 with a fin block 5 and can also be used for passive cooling of computer processors. That is, it can be operated even without using a separate fan where the power supply configuration is adjusted to the cooling system. The increase in the surface area of the condenser and ribs as well as the fitting of four condenser pipes 6 in a row to a level condenser 2, not only allows space-saving installation in computers as a result of the geometrical conditions of fitting it in the suction area of the power supply fan, but also makes it possible to help in passive cooling.

FIG. 3 shows a cooling system according to the invention, which is fitted with a condenser 2 and a tubular vapor distribution and condenser element 3, similar to the embodiments in FIG. 1 and FIG. 2. However, two heat loss sources with one evaporator 1 each are connected to the system. This combination is often encountered for instance in computers, where apart from the CPU, which is the main source of heat loss, the graphic card also must be cooled.

In applications, where the heat sources are located above or below the heat sink and the heat sources are not located in immediate vicinity to the heat sink, embodiments as shown in FIG. 3 are preferably used. To ensure the functional efficiency of the evaporator 1, which is located above the condenser 2, the connecting pipe 4, which is designed as a pipe without heat pipe structure 8, must be connected to the evaporator 1 fitted below the condenser 2 at a height H above the lowest point of the vapor-distribution and condensate-collection element 3. This is necessary to enable retention and transportation of condensate via the connecting pipe with heat pipe structure 7 to the evaporator 1 positioned above the vapor-distribution and condensate-collection element 3. The condensate transportation is then smooth, if the insertion length L and the related overlapping are adequately dimensioned, to utilize the capillary effect of the heat pipe structure. The height difference H and the insertion length L are thus necessary for adequate flooding of the capillary structure with condensate, in order to ensure the operation of the evaporator 1 positioned above the vapor distribution and collection element 3. The dimensions H and L depend on the amount filled in, on the diameter D and the transportation capacity of the heat pipe structure of the connecting pipe 7 and also on the thermal load of the system.

The height H of the projection is about 0.5 to 1 times the diameter D of the pipe with the heat pipe structure 7. The insertion length L is about ⅓ to ⅔ of the overall length of the tubular vapor-distribution and condensate-collection element 3.1.

The connecting pipe 7 is provided with an inner heat pipe structure, while the connecting pipe 8 is designed as a smooth pipe to the evaporator 1 positioned below the vapor-distribution and condensate-collection element 3, where in the latter case, the condensate flows back to the evaporator by gravity.

Figure 4:
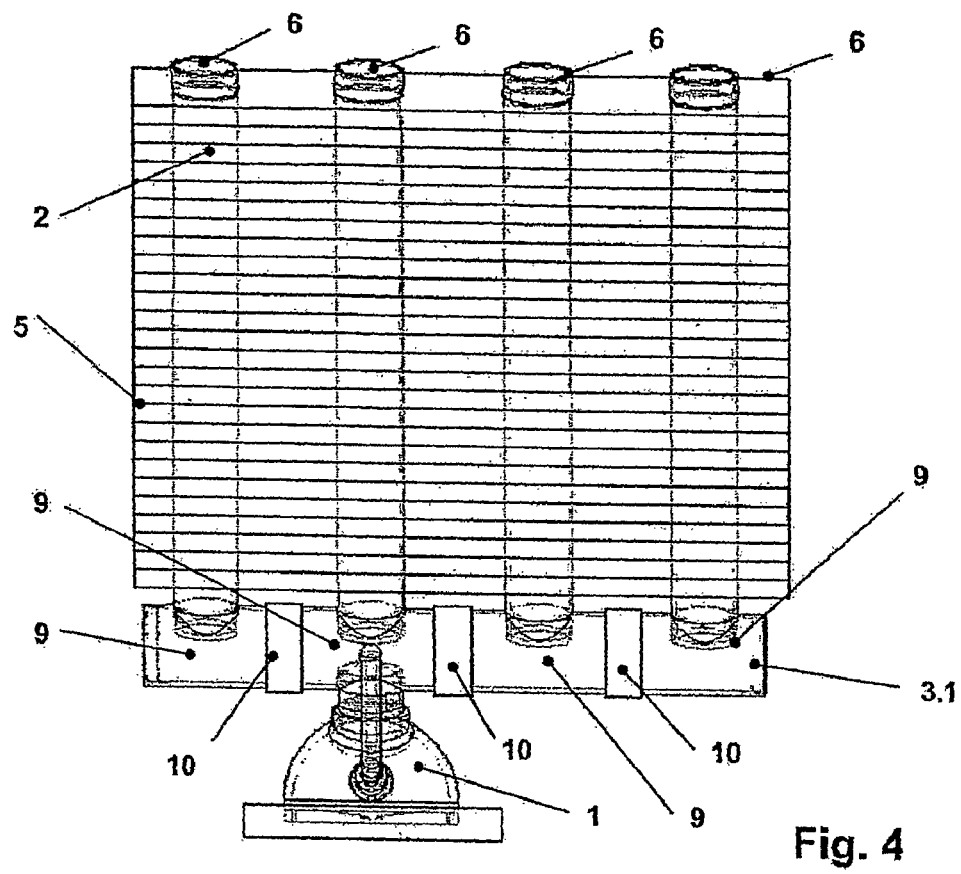

FIG. 4 shows an alternative embodiment of the cooling system, wherein the tubular vapor-distribution and condensate-collection element 3.1 modularly consists of collars 9 for connecting the condenser pipes 6 and adapters 10. The design of the tubular vapor-distribution and condensate-collection element 3.1 consisting of collars 9 and connectors 10 advantageously allows flexible adjustment of the condenser surface and of performance of the cooling system in various use cases.

The connecting pipe 4 and the pipe with heat pipe structure 7, respectively, as well as the pipe without heat pipe structure 8 can have a length of up to 90 cm. Good or poor heat conducting materials can be beneficially used as materials depending on the case of application.

If the condenser performance is dissipated directly to the environment of the electronic device outside the device housing, a poor heat-conducting connecting pipe ought to be selected, to prevent the dissipation of heat loss further to the interior of the electronic device on the way to the condenser 2. Alternatively, for designing a poor heat-conducting connector, the line can be equivalently thermally insulated, so that the heat flow to the interior of the device is reduced.

If good ventilation of the electronic device is ensured, the insulation of the connecting pipe can be omitted. The heat radiating area of the connecting pipe 4 can be used partially for bringing about condenser performance.

Figure 5:
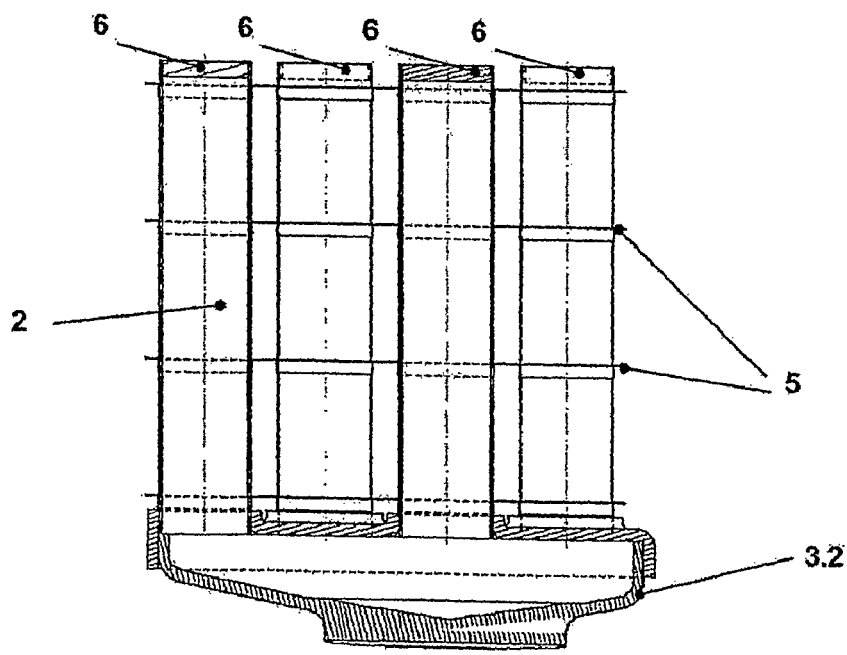

FIG. 5 shows in cross section an alternative embodiment of the cooling system according to the invention, wherein the vapor-distribution and condensate-collection element 3.2 is designed to be level and the condenser pipes 6 are fitted orthogonally to this level. It is beneficial to design the evaporator 1 and the level vapor-distribution and condensate-collection element 3.2 as an integral unit, so that there is no need for connecting pipes between the evaporator 1 and the vapor-distribution and condensate-collection element 3.2. This embodiment of the invention can however be used only in electronic devices, wherein the space conditions allow such an installation. The condenser 2 has a bigger space requirement above the heat generating electronic component. Since it is possible to fit a larger number of condenser pipes 6 into the level vapor-distribution and condensate-collection element 3.2, it is possible to achieve an equivalent high condensation performance with a much lower pipe length than shown in FIG. 2. The alternative constructional implementation thus allows very compact forms of embodiments of the cooling system according to the invention.

Figure 6A:
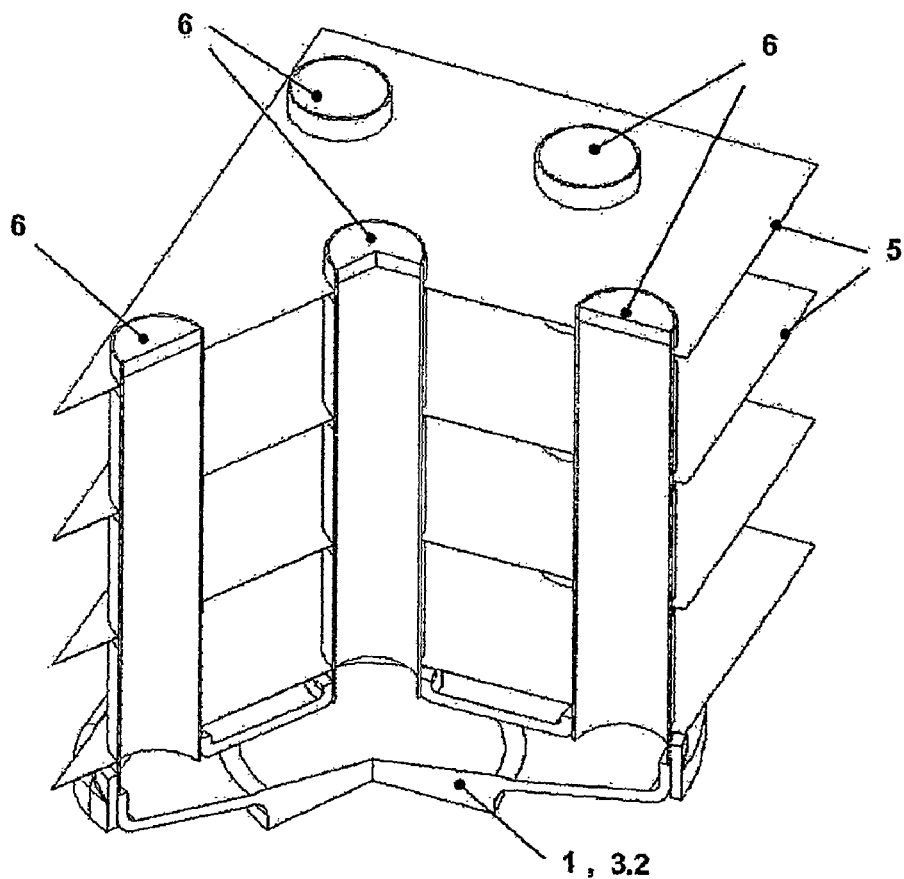

FIG. 6a shows a cross section of the cooling system in perspective. The level vapor-distribution and condensate-collection element 3.2 is preferably composed of two elements, wherein a lower level element has the evaporator function and an upper level element is equipped with couplings to connect the condenser pipes 6.

Figure 6B:
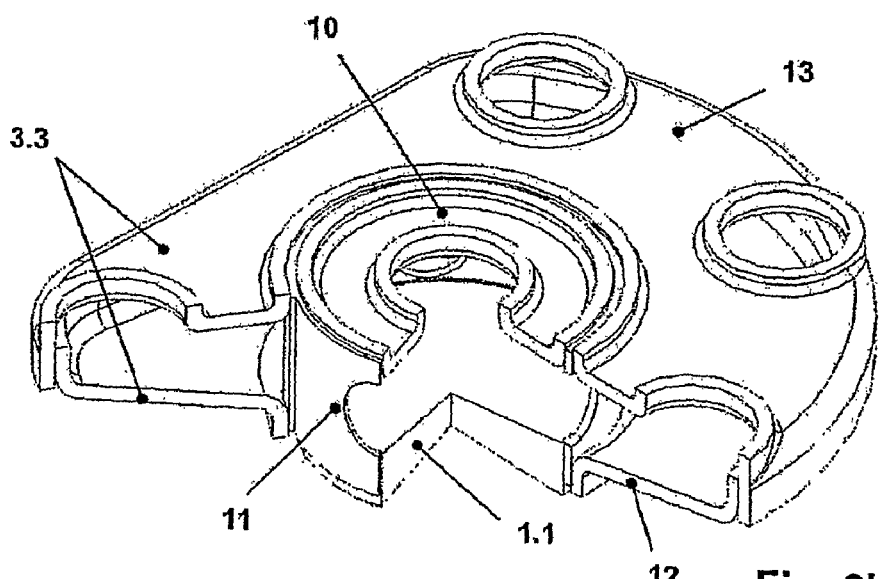

FIG. 6b shows an alternative to the level vapor-distribution and condensate-collection element with longitudinal stay 3.3, wherein both the upper and also the lower level element are designed in two parts. The lower level segment consists of an evaporator element 1.1 and a lower expansion element 12, at the joint of which, the longitudinal stay 11 is fitted at the lower end. The upper level segment consists of a upper expansion element 13 and an adapter 10, at the joint of which, the longitudinal stay 11 is fitted at the lower end. The longitudinal stay 11 stabilizes the level vapor-distribution and condensate-collection element 3.3 and thus enables the use of coolants with high operating pressures.

Spatial condenser designs according to the latest presented embodiments of the invention can advantageously be used particularly where the space conditions in electronic devices allow them and when a particularly large amounts of heat loss must be dissipated, in order to ensure operation of electronic devices.

On the whole, the advantages of the invention lie in the fact that the vapor distribution can use a condenser of any size. By experience, the heat absorption in the evaporator must be very concentrated, since the heat loss generation in electronic components is concentrated on a very small surface.

LIST OF REFERENCE NUMBERS

1 Evaporator
1.1 Evaporator element
2 Condenser
3 Vapor-distribution and condensate-collection element
3.1 Tubular vapor-distribution and condensate-collection element
3.2 Level vapor-distribution and condensate-collection element
3.3 Level vapor-distribution and condensate-collection element with tie rod
4 Connecting pipe
5 Fin block
6 Condenser pipes
7 Pipe with heat pipe structure
8 Pipe without heat pipe structure
9 Collar
10 Adapter, connector
11 Tie rod
12 Lower expansion element
13 Top expansion element
H Height of condensate level in the vapor-distribution and condensate-collection element
L Insertion length
D Diameter of pipe with heat pipe structure

The invention claimed is:

1. A cooling system for electronic devices, especially computers, comprising:
a vapor-distribution and condensate-collection element (3) and a condenser (2) with a plurality of condenser pipes (6) and a block of fins (5) connecting the condenser pipes (6);
wherein the condenser pipes (6) are arranged parallel to each other and extend upwards from the vapor-distribution and condensate-collection element (3) and are closed at their top ends;
a plurality of evaporators (1) fitted and connected with the vapor-distribution and condensate-collection element (3), at least a first of said plurality of evaporators disposed vertically lower than the condensate-collection element (3) and at least a second of said plurality of evaporators disposed vertically higher than the condensate-collection element (3);
wherein a first connecting pipe (8) without a heat pipe structure is fitted between the first evaporator (1) and the vapor-distribution and condensate-collection element (3);
wherein a second connecting pipe (7) with an internal heat pipe structure is fitted between the second evaporator (1) and the vapor-distribution and condensate collection element (3); and
wherein the first connecting pipe (8) is connected into the vapor-distribution and condensate-collection element (3) at a height (H) of 0.5 to 1 times a diameter (D) of the second connecting pipe (7) with said heat pipe structure.

2. A cooling system for electronic devices, especially computers, comprising:
an evaporator (1);
a vapor-distribution and condensate-collection element (3) and a condenser (2) with a plurality of condenser pipes (6) and a block of fins (5) connecting the condenser pipes (6);
wherein the condenser pipes (6) are arranged parallel to each other and extend upwards from the vapor-distribution and condensate-collection element (3) and are closed at their top ends;
wherein a connecting pipe (4) is fitted between the evaporator (1) and the vapor-distribution and condensate-collection element (3); and
wherein the connecting pipe (4) is designed as a pipe with a heat pipe structure (7) where the condenser (2) is arranged below the evaporator (1) and the pipe with heat pipe structure (7) is connected into the vapor-distribution and condensate-collection element (3.1) with an insertion length (L) of one third to two thirds of the length of the vapor-distribution and condensate-collection element (3.1).

3. The cooling system according to claim 2, further including a second evaporator (1) disposed vertically lower than the condenser (2); and
a second connecting pipe (8) configured as a pipe without heat pipe structure fitted between the second evaporator (1) and the vapor-distribution and condensate-collection element (3.1), said second connecting pipe (8) connected into the vapor-distribution and condensate-collection element (3.1) at a height (H) of 0.5 to 1times the diameter (D) of the connecting pipe with the heat pipe structure (7).

4. A cooling system for electronic devices, especially computers, comprising:
a vapor-distribution and condensate-collection element (3) consisting of a horizontal pipe (3.1) and a condenser (2);
a plurality of an evaporators (1), at least one of said plurality of evaporators disposed vertically higher than said condenser, and at least another of said plurality of evaporators disposed vertically lower than, said condenser (2);
wherein said condenser (2) consists of a plurality of condenser pipes (6) interconnected by a block of radiating fins (5), said condenser pipes (6) arranged parallel to each other and are fitted to extend radially upwards from a surface line of the horizontal pipe (3.1) and having enclosed top ends;
wherein each individual evaporator (1) disposed vertically higher than said condenser (2) is coupled to said horizontal pipe (3.1) of the vapor-distribution and condensate-collection element (3) by a connecting pipe (7) having a common diameter (D) and an internal heat pipe structure; and
wherein each individual evaporator (1) disposed vertically lower than said condenser (2) is coupled to said horizontal pipe (3.1) of the vapor-distribution and condensate-collection element (3) by a connecting pipe (8) without an internal heat pipe structure.

5. The cooling system of claim 4 wherein each connecting pipe (8) without an internal heat pipe structure is connected into the horizontal pipe (3.1) of the vapor-distribution and condensate-collection element (3) at a height (H) of 0.5 to 1 times the diameter (D) of each connecting pipe (7) with the internal heat pipe structure.

6. The cooling system of claim 4 wherein each connecting pipe (7) without the internal heat pipe structure is connected into the horizontal pipe (3.1) with an insertion length (L) extending for one-third to two-thirds of the length of the horizontal pipe (3.1).

* * * * *